Patented May 4, 1926.

1,583,169

UNITED STATES PATENT OFFICE.

HARRY R. PENNINGTON, OF CHICAGO, ILLINOIS.

COATED WELDING ROD.

No Drawing.   Application filed May 3, 1922.   Serial No. 558,299.

*To all whom it may concern:*

Be it known that I, HARRY R. PENNINGTON, a citizen of the United States, residing at Chicago, in the county of Cook and State of Illinois, have invented certain new and useful Improvements in Coated Welding Rods, of which the following is a specification.

This invention relates to improvements in coated welding rods used in metallic welding, more particularly in electric arc welding, where the rod forms one terminal of the arc and is fused or welded onto a body of metal, called the base metal.

The object of my invention is to provide a rod of desired metal, having a coating which will function to enhance the fusion of the welding metal to the base metal, especially where it is necessary to weld on to a surface inclined to the horizontal or overhead.

It has been found somewhat difficult in this class of welding to deposit the metal from these fusible electrode rods, especially when coated with an appreciable coating containing ingredients such as silica, calcium carbonate and sodium silicate, used to enhance and strengthen the weld, where the surface being applied is vertically inclined or overhead. It would appear from tests and welding operations upon surfaces of the character described that this difficulty is due to the greatly decreased rate of cooling of the fused metal, caused by the presence of the coating.

I have discovered that an adherent, non-flowing deposit may be secured on surfaces presenting the difficulty mentioned by utilizing constituents in the coating of the rod which function to give the deposited metal a solidification or congealing rate comparable to that secured by the use of bare metal electrodes of mild carbon steel, for example.

I find that iron oxide or barium carbonate function to obtain this desired result, due to some physical or chemical phenomenon.

A welding electrode or rod embodying my invention may be constructed as a rod of steel or metal such as soft iron, steel, iron alloys or non-ferrous metals and other alloys, which I cover or coat with a mixture containing barium carbonate or iron oxide, for example, as an ingredient to promote rapid congealing of the fused metal. In some instances I find it desirable to add such materials as calcium carbonate, silica or sodium silicate to facilitate the arc manipulation and protection of the transferred metal in a well known manner. To properly attach and secure the solidifying ingredient on the electrode surface, I find it desirable to apply it in conjunction with a refractory binder, such as a water solution of potassium silicate.

One formula which I have found satisfactory consists (by volume) of—

20 parts of diluted potassium or sodium silicate (about 1.2 specific gravity) to 8 parts calcium carbonate, 2 parts of iron oxide, by volume.

Another formula consists of approximately—

2 parts of sodium silicate and 1 part of barium carbonate, by volume.

Another formula consists of—

4 parts of sodium silicate to 1 part barium carbonate, and 1 part calcium carbonate, by volume.

Another formula consists of—

20 parts sodium silicate to 8 parts silica flour, and 2 parts iron oxide by volume.

Another formula consists of—

4 parts sodium silicate to 1 part silica, and 1 part barium carbonate by volume.

It will be obvious that the proportions and ingredients may be varied according to the conditions met with and the results desired, without varying from the spirit of the invention. For example, other compounds of the alkaline earth metals may be substituted for barium of calcium carbonate. I also find that the specific gravity of the potassium or sodium silicate may be varied with a variation in the results obtained. The coating is applied to the rods by forming a solution of the ingredients specified, into which the rods are dipped and then allowed to dry in the usual manner.

While I have described and claimed my invention with more or less particularity, I do not wish to be restricted to the ingredients or proportions disclosed, except as defined in the appended claim.

What I claim is—

An electrode for arc welding comprising a metal core having a coating containing sodium silicate, calcium carbonate and a third ingredient to control the fusion point of the electrode, the sodium silicate being at least as great by volume as the volume of the two other ingredients.

In testimony whereof, I have subscribed my name.

HARRY R. PENNINGTON.